(12) United States Patent  (10) Patent No.: US 9,250,822 B2
Qian  (45) Date of Patent: Feb. 2, 2016

(54) DATA STORAGE METHOD AND DATA STORAGE APPARATUS

(71) Applicant: Huawei Technologies Co., LTD, Shenzhen (CN)

(72) Inventor: Xiaobin Qian, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 14/021,702

(22) Filed: Sep. 9, 2013

(65) Prior Publication Data

US 2014/0013051 A1  Jan. 9, 2014

Related U.S. Application Data

(63) Continuation of application No. PCT/CN2013/070361, filed on Jan. 11, 2013.

(30) Foreign Application Priority Data

Mar. 12, 2012 (CN) .......................... 2012 1 0062799

(51) Int. Cl.
*G06F 12/00* (2006.01)
*G06F 3/06* (2006.01)
(Continued)

(52) U.S. Cl.
CPC ............ *G06F 3/0644* (2013.01); *G06F 3/0607* (2013.01); *G06F 3/0677* (2013.01); *G06F 9/4411* (2013.01); *G06F 12/0246* (2013.01); *G06F 12/0646* (2013.01);
(Continued)

(58) Field of Classification Search
CPC .......................... G06F 12/0246; G06F 12/0646
USPC .......................................................... 711/115
See application file for complete search history.

(56) References Cited

U.S. PATENT DOCUMENTS 6,405,278 B1   6/2002  Liepe
2007/0169084 A1*  7/2007  Frank .................. G06F 9/44505
                                                       717/168

(Continued)

FOREIGN PATENT DOCUMENTS

CN  1889729 A  1/2007
CN  101272242 A  9/2008

(Continued)

OTHER PUBLICATIONS

"DropboxPortableAHK—Portable Dropbox App," Retrieved from URL: https://web.archive.org/web/20120213191045/http://nionsoftware.com/dbpahk/instructions, Feb. 13, 2012, 10 pages.

(Continued)

*Primary Examiner* — Prasith Thammavong
(74) *Attorney, Agent, or Firm* — Slater & Matsil, L.L.P.

(57) ABSTRACT

A data storage method and a data storage apparatus are provided. The method includes determining a type of operating system of a host. A configuration file corresponding to the type of the operating system is stored in a data card connected to the host. A memory file system is established according to a first mounting information in the configuration file. A storage device is mounted according to a second mounting information in the configuration file. A correspondence between a storage space in the memory file system and the mounted storage device is set. The mounted storage device is used to store data that is to be stored in the data card.

8 Claims, 7 Drawing Sheets

(51) Int. Cl.
   *G06F 12/02*    (2006.01)
   *G06F 12/06*    (2006.01)
   *H04L 29/08*    (2006.01)
   *G06F 9/44*     (2006.01)
   *H04W 4/00*     (2009.01)

(52) U.S. Cl.
   CPC ............ *H04L 67/06* (2013.01); *H04L 67/1095* (2013.01); *H04W 4/003* (2013.01)

(56)          References Cited

U.S. PATENT DOCUMENTS

2007/0255920 A1      11/2007  Gold
2008/0235443 A1*     9/2008   Chow et al. .................. 711/103
2009/0113249 A1*     4/2009   Liu et al. ......................... 714/42
2010/0131794 A1*     5/2010   Zheng et al. ...................... 714/6

FOREIGN PATENT DOCUMENTS

CN      101408856 A       4/2009
CN      101556813 A       10/2009
CN      102541475 A       7/2012
WO      2011148223 A1     12/2011

OTHER PUBLICATIONS

Wetek, C., "Mount Dropbox Account on Linux < Techno Blob," Retrieved from URL: https//web.archive.org/web/20120214204125/ http://chris.wetek.org/2011/04/02/how-to-ount-dropbox-account-on-linux/, Feb. 14, 2014, 3 pages.

* cited by examiner

DATA STORAGE METHOD AND DATA STORAGE APPARATUS

CROSS-REFERENCE TO RELATED APPLICATIONS

This application is a continuation of International Application No. PCT/CN2013/070361, filed on Jan. 11, 2013, which claims priority to Chinese Patent Application No. 201210062799.8, filed on Mar. 12, 2012, both of which are hereby incorporated by reference in their entireties.

TECHNICAL FIELD

The present invention relates to the field of data storage technologies and, in particular embodiments to a data storage method and a data storage apparatus.

BACKGROUND

A data card is a device that provides an additional application function and is applied to a portable device such as a portable computer, for example, a mobile data card is a device that enables, through a mobile communications technology, a portable device to access a mobile network. During working, a data card that is connected to a portable device through a universal serial bus (USB) interface is referred to as USB data card.

As mobile applications rapidly become various and people have an increasingly growing requirement for network access convenience, the number of data card users rapidly increases. Users expect that a data card can carry more data to support various application programs, and mobile service operators and data card providers also expect to provide more various and more complicate applications for the users through the data card. However, due to a restriction of a manufacturing skill of the data card, storage capacity and interface input/output (I/O) performance of the data card cannot meet the requirement currently. By taking a USB interface on a USB data card as an example, in the aspect of I/O performance, there is a large gap between the USB interface and another interface, such as an integrated-drive-electronics (IDE) interface or a serial advanced technology attachment (SATA) interface, used in a host or a large-capacity storage.

In a process of implementing the present invention, the inventor finds that, except that an improvement is made to a manufacturing skill of a data card, the prior art fails to provide a solution that can effectively solve a problem of a restriction of storage capacity of the data card.

SUMMARY OF THE INVENTION

An embodiment of the present invention provides a data storage method, so as to solve a problem of a restriction of storage capacity of a data card without replacing a hardware structure of the data card.

Correspondingly, an embodiment of the present invention further provides a data storage apparatus.

In one embodiment, a data storage method includes determining a type of an operating system of a host, reading a configuration file. The configuration file corresponds to the type of the operating system. The configuration file is stored in a data card connected to the host. A memory file system is established according to first mounting information in the configuration file. The memory file system is compatible with a first type of a file system of the host. The first mounting information comprises a type of the memory file system and a mounting parameter. The mounting parameter comprises capacity of the memory file system. A storage device is mounted according to second mounting information in the configuration file. The storage device comprises at least one of a local storage of the host and a network storage connected to the host. The second mounting information comprises a second type of a file system, an access protocol, a mounting sequence, and a mounting position. A correspondence between a storage space in the memory file system and the mounted storage device is set according to configuration information in the configuration file. The configuration information comprises an identifier of the mounted storage device and a size of the storage space in the memory file system.

A data storage apparatus includes a first determining unit, which is configured to determine a type of an operating system of a host. An establishing unit is configured to read a configuration file. The configuration file corresponds to the type of the operating system. The configuration file is stored in a data card connected to the host. The establishing unit is also configured to establish a memory file system according to first mounting information in the configuration file. The memory file system is compatible with a first type of file system of the host. The first mounting information comprises a type of the memory file system and a mounting parameter. The mounting parameter comprises capacity of the memory file system. A storage mounting unit is configured to mount a storage device according to second mounting information in the configuration file. The storage device comprises a local storage of the host and/or a network storage connected to the host. The second mounting information comprises a second type of a file system, an access protocol, a mounting sequence, and a mounting position. A setting unit is configured to set, according to configuration information in the configuration file, a correspondence between a storage space in the memory file system and a mounted storage device. The configuration information comprises an identifier of the mounted storage device and a size of the storage space in the memory file system.

In embodiments of the present invention, according to an operating system type of a host to which a data card is connected, a memory file system adaptive to the operating system type is established. Then multiple storage devices are mounted according to configuration information in the data card, so as to establish a virtual storage system, where a storage device in the virtual storage system may be used to store data that is to be stored in the data card. Afterwards, correspondence between a storage space in the memory file system and a mounted storage device is set, thereby extending storage capacity of the data card to storage capacity that can be provided by the virtual storage system, without changing a hardware structure of the data card.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

When a data card is used, the data card needs to be connected to a host, which depends on a running environment such as an operating system of the host. The inventor creatively proposes establishing an extended storage system by using various available storage devices when a data card is connected to a host, and provides a solution for storing and managing data in the extended storage system.

A main implementation principle and a specific implementation manner of the embodiments of the present invention, and beneficial effects that can be achieved by the technical solutions in the embodiments of the present invention are described in detail in the following with reference to the accompanying drawings.

Figure 1:
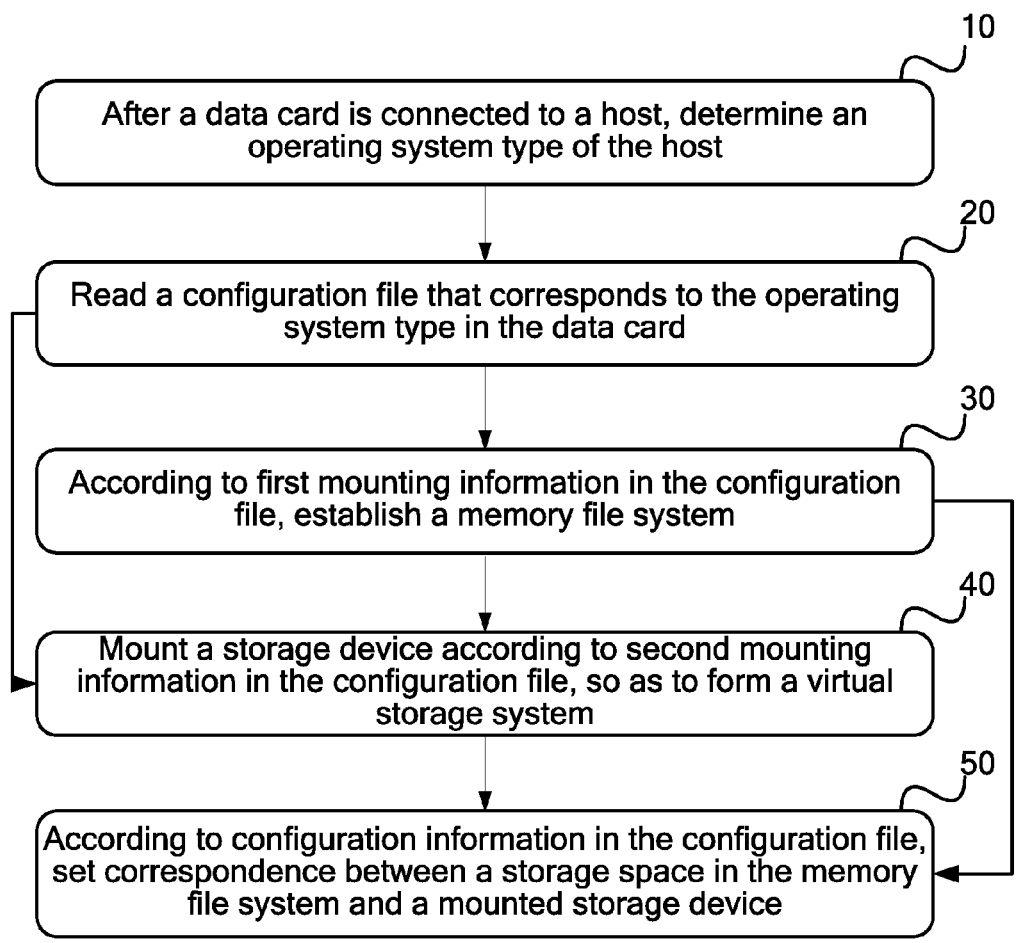
FIG. 1 is a flow chart showing a main implementation principle of a data storage method according to an embodiment of the present invention.

As shown in FIG. 1, a procedure of a main implementation principle of an embodiment of the present invention is described as follows.

Step 10: After a data card is connected to a host, determine an operating system type of the host.

The data card may be a USB data card with a USB interface; and in such a case, the data card may be directly connected to the host through the USB interface of the data card. The data card may also be a secure digital memory card (SD, Secure Digital Memory Card), and in a case that the host supports an SD interface (at present, most of portable computers support SD interface access), the data card can be directly connected to the host; and in a case that the host does not support an SD interface, the data card may be connected to the host through a USB interface of a card reader.

After a system-level application programming interface (API, Application Programming Interface) in the operating system of the host detects that an external device is connected to the host, the system-level application programming interface can identify a file system type of the external device, identify a format of a file in the external device, and the like.

The host may further perform information exchange with the external device through an access protocol that corresponds to the file system type of the external device. Herein, the host may send information about the operating system type of the host to the USB data card through an access protocol that corresponds to a file system type of the USB data card.

The operating system type of the host includes Windows XP, Windows 7, Linux, and the like.

Step 20: The data card reads a configuration file that corresponds to the operating system type in the data card.

Optionally, by taking a USB data card as an example, the USB data card stores a directory of the same name or a folder of the same name, where the directory or the folder corresponds to each operating system type, and the directory of the same name or the folder of the same name, which corresponds to each operating system type, stores a configuration file of the operating system type. Definitely, in addition to a manner of storing a configuration file corresponding to an operating system type by using a directory of the same name or a folder of the same name, another manner may also be used, for example, a mapping table of an operating system type and a configuration file identifier (for example, storage path+file name) is stored, after the operating system type of the host is determined, a configuration file corresponding to the operating system type of the host is determined by reading the mapping table.

Step 30: According to first mounting information in the configuration file, establish a memory file system that is compatible with the file system type of the host.

The first mounting information is used for indicating a manner of establishing a memory file system and a parameter of an established memory file system; and the first mounting information includes: a memory file system type, such as a new technology file system (NTFS, New Technology File System), a file allocation table (FAT32, File Allocation Table), and the like.

The first mounting information further includes a mounting parameter, and the mounting parameter includes capacity of the memory file system.

A specific manner of establishing the memory file system is described in detail in the following with reference to FIG. 2.

Step 40: Mount each storage device according to second mounting information in the configuration file, so as to form a virtual storage system.

The storage device includes any one or a combination of: a local storage of the host, a local disk partition, and a network storage that is connected to the host. The network storage includes a file transfer protocol (FTP, File Transfer Protocol) server, a network file system (NFS, Network File System) server, a network attached storage (NAS, Network Attached Storage)/a serial attached SCSI (SAS, Serial Attached SCSI) network storage server, and the like.

The second mounting information includes a storage device identifier, a supportable file system type, an access protocol that is correspondingly used when a storage device with a different file system type is mounted, a mounting sequence, a mounting position (mounting point), and the like.

Optionally, to protect data in a storage device for storing important data and special data from being modified by a user read/write request subsequently, the second mounting information further includes read/write permission (for example, read only, read-write, and the like) of each storage device.

A specific process of mounting each storage device is described in detail in the following with reference to FIG. 3.

Step 50: According to configuration information in the configuration file, set correspondence between a storage space in the memory file system and a mounted storage device.

The configuration information includes: for each storage device identifier (which may also be a type identifier of a storage device), whether to set a corresponding storage space for a storage device that corresponds to the storage device identifier in the memory file system, and information indicating a size of a set storage space in the memory file system; and definitely, may further include other information such as a rule of adjusting a setting policy according to the number of storage devices.

A purpose of setting the foregoing correspondence is to use the memory file system as a cache device when a read/write request is received subsequently. Storage spaces corresponding to each storage device in the memory file system do not overlap with each other.

Optionally, in consideration of a restriction of a storage space of a memory file system, in order to store data that has a high requirement for read/write real-time quality in the memory file system as much as possible, the correspondence is correspondence between a storage space in a memory file system and a storage space of a pre-determined file in a mounted storage device, as shown in Table 1. The pre-determined file is a file selected according to a pre-determined screening rule, that is, a file, in the storage device, where a part of data that has a high requirement for real-time quality is located, is mirrored into the memory file system, and other common user data is only stored in the storage device. The screening rule includes parameters such as a type of a file and a frequency threshold of accessing the file. For example, a system file of which an access frequency exceeds the threshold is mirrored into the memory file system according to the screening rule.

TABLE 1

| Storage space of a memory file system | Storage device identifier | Storage space of a storage device |
|---|---|---|
| 0010FFFF-001FFFFF | Disk E | 0070FFFF-007FFFFF |
| 0020FFFF-002FFFFF | Gmail server | 0080FFFF-008FFFFF |
| ... | ... | ... |
| 0050FFFF-005FFFFF | FTP server | 00E0FFFF-00EFFFFF |

In a data storage solution provided in the embodiment of the present invention, through step 10 to step 40, according to an operating system type of a host to which a data card is connected, a memory file system adaptive to the operating system type is first established, then multiple storage devices are mounted according to configuration information in the data card, so as to establish a virtual storage system, and correspondence between a storage space in the memory file system and a storage device in the virtual storage system is set, where the virtual storage system may be used to store data that is to be stored in the data card. That is to say, the data card needs to store only information of a storage device that is used for storing service data and is to be mounted, and does not need to store a large amount of service data. In this way, establishment of the virtual storage system is implemented on the basis of a configuration file in the data card, thereby extending storage capability of the data card to storage capacity that can be provided by the whole virtual storage system and is specified in the configuration file, without changing a hardware structure of the data card, so that difficulty in implementation is relatively low.

Figure 2:
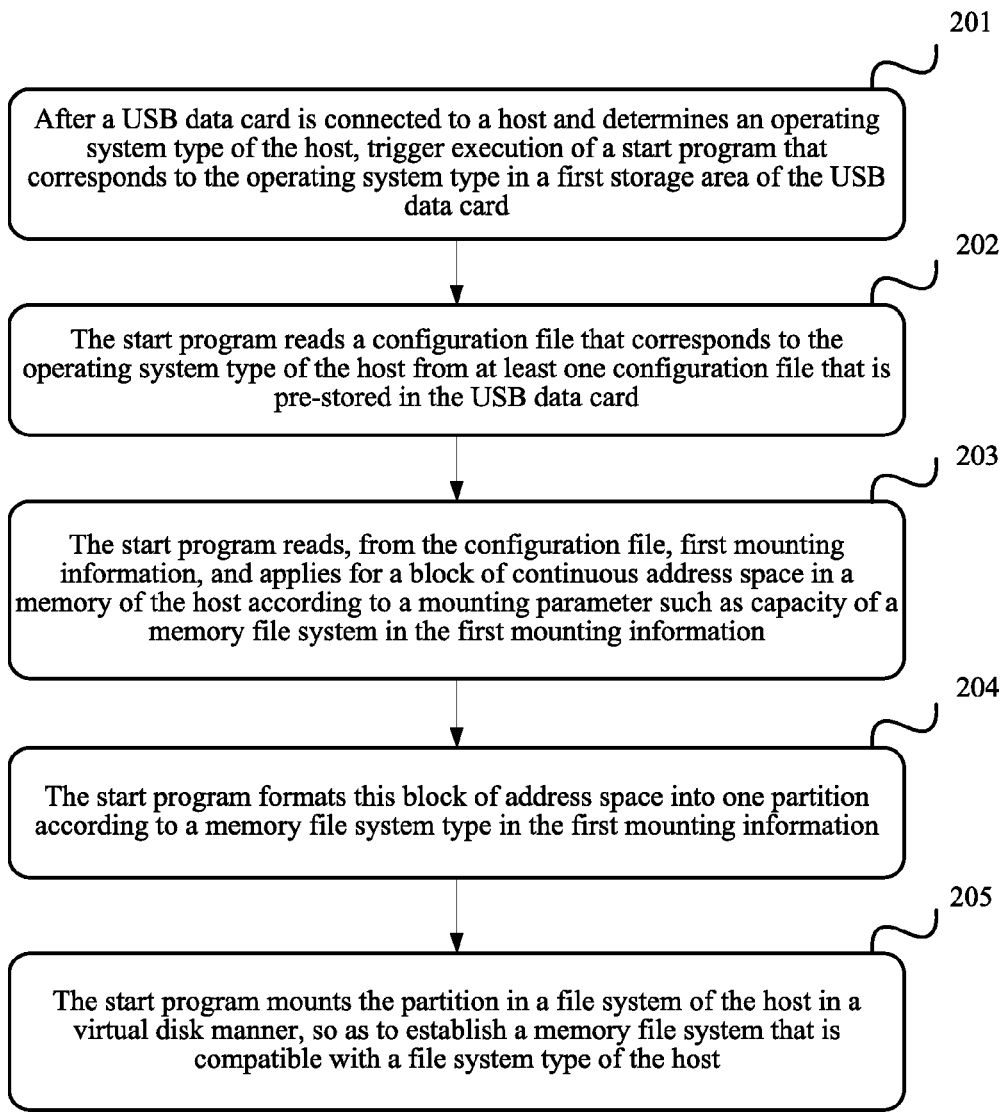
FIG. 2 is a schematic flow chart of establishing a memory file system according to an embodiment of the present invention.

FIG. 2 is a schematic flow chart of establishing a memory file system according to an embodiment of the present invention. Manners of establishing a memory file system in various data cards are basically similar except that interface types are slightly different, and therefore, only a USB data card is taken as an example for description herein, and in a data card of another type, a memory file system may also be established by using a similar principle.

Step 201: After the USB data card is connected to a host and determines an operating system type of the host, trigger execution of a start program that corresponds to the operating system type in a first storage area of the USB data card, where the first storage area is set to a CD-ROM driver data format by a CD-ROM driver virtual program.

Optionally, in the USB data card, data in the first storage area of the USB data card is virtualized into a virtual CD-ROM driver file system format, such as an ISO9660 file system format, through a CD-ROM driver virtualization program or in a hardware manner in advance, where the first storage area includes a start program that corresponds to each operating system type, and optionally, may further include a configuration file that corresponds to each operating system type and other important data that is not allowed to be modified by a user.

Advantages of adopting CD-ROM driver virtualization lie in that, in one aspect, important data may be protected from being modified due to misoperation of a user. In another aspect, generally, self-start check performed by the operating system of the host on a CD-ROM driver is looser than self-start check on an application program of another file format. Definitely, there are some prerequisites in automatically triggering the start program that corresponds to the operating system type of the host. First, the start program needs to be stored in the form of an auto.int file. Second, the operating system of the host needs to support a CD-ROM driver self-start working mode.

Step 202: The start program reads a configuration file that corresponds to the operating system type of the host from at least one configuration file that is pre-stored in the USB data card.

Step 203: The start program reads, from the configuration file, first mounting information that is used for establishing a memory file system, and applies for a block of continuous address space in a memory of the host according to a mounting parameter such as capacity of the memory file system in the first mounting information.

Step 204: The start program formats this block of address space into one partition according to a memory file system type in the first mounting information.

Herein, it should be noted that, the memory file system type in the first mounting information is compatible with the operating system type of the host, and a case that the memory file system type is consistent or inconsistent with a file system type of the host exists. For compatibility between a file system and an operating system, reference is made to a relevant document, which is not described herein again.

Step 205: The start program mounts the partition in a file system of the host in a virtual disk manner, so as to establish a memory file system that is compatible with the file system type of the host.

For example, if the file system type of the host is NTFS, the capacity of the memory file system in the first mounting information is 10 M, and the memory file system type is NTFS or FAT32, a 10-M memory file system that is consistent with NTFS is established or a 10-M FAT32-type memory file system that is compatible with NTFS is established in the host in the manner described in the foregoing.

Figure 3:
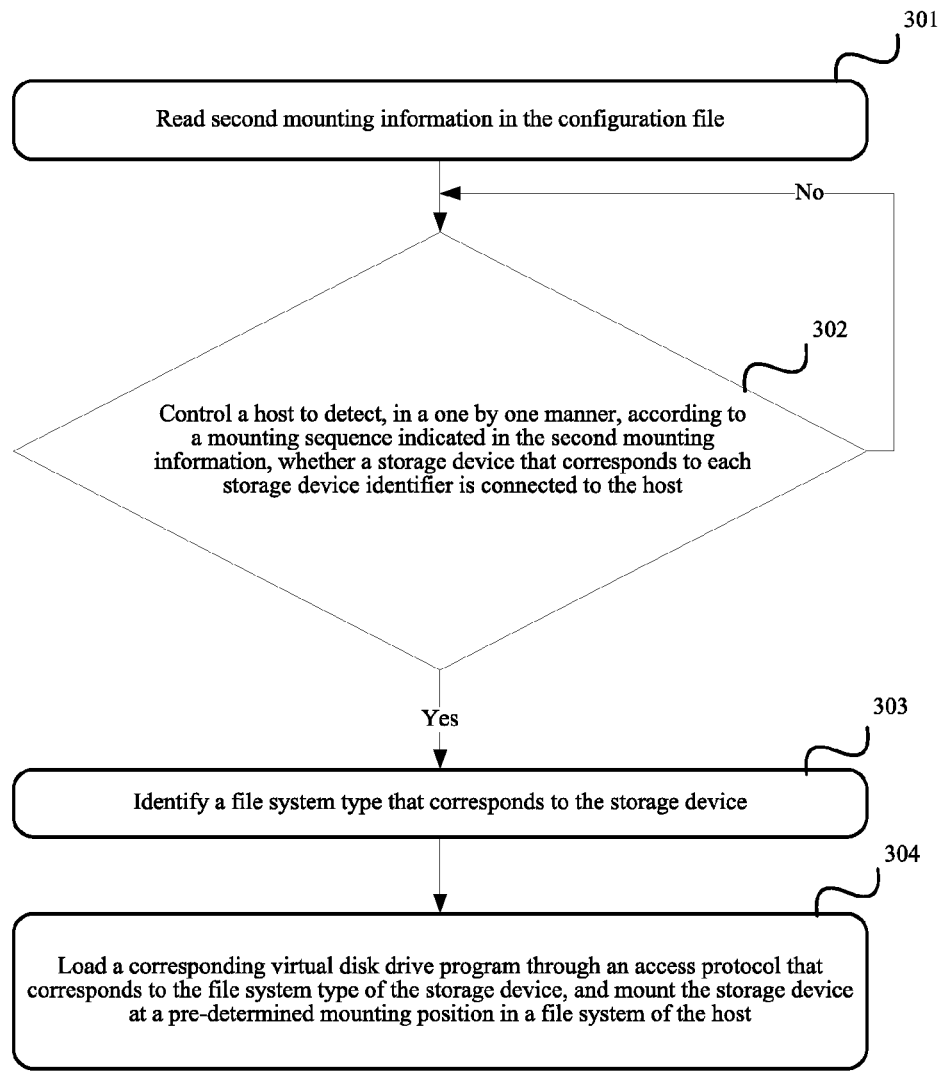
FIG. 3 is a schematic flow chart of mounting each storage device according to an embodiment of the present invention.

FIG. 3 is a schematic diagram showing a specific process of mounting each storage device according to an embodiment of the present invention.

Step 301: Read second mounting information in the configuration file.

Optionally, after a start program establishes a memory file system, an initialization program in the first storage area may be triggered, so that each storage device is mounted through the initialization program, so as to establish a virtual storage system.

Step 302: Control a host to detect, in a one by one manner, according to a mounting sequence indicated in the second mounting information, whether a storage device that corresponds to each storage device identifier is connected to the host; and if yes, proceed to step 303; otherwise, detect whether a storage device that corresponds to a next storage device identifier is connected to the host, until detection for a connection state of a storage device that corresponds to the last device identifier is completed.

Step 303: When it is detected that a storage device that corresponds to a storage device identifier in the second mounting information is connected to the host, identify a file system type that corresponds to the storage device.

Step 304: Load a corresponding virtual disk drive program through an access protocol that corresponds to the file system type of the storage device, and mount the storage device at a pre-determined mounting position in a file system of the host. The access protocol includes a local serial advanced technology attachment (SATA, Serial Advanced Technology Attachment), a local small computer system interface (SCSI, Small Computer System Interface), a remote hypertext transfer protocol (HTTP, HyperText Transfer Protocol), a remote NFS, and the like.

With the solution shown in FIG. 1, a purpose of extending a storage space of a data card can be achieved. Further, referring to FIG. 4 and FIG. 5, an embodiment of the present invention further provides a method for reading and writing data in a data card with an extended storage space.

Figure 4:
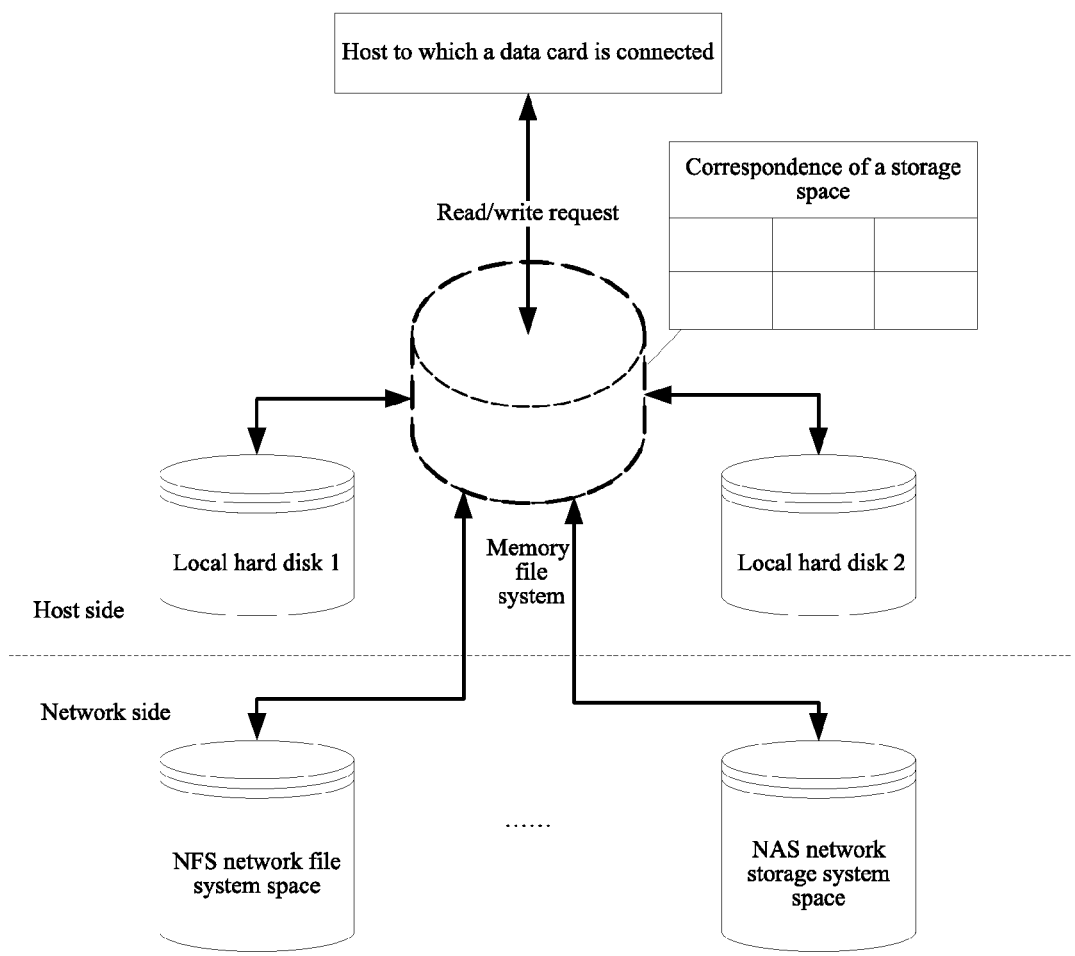
FIG. 4 is a schematic diagram of an established virtual storage system and a solution of processing a read/write request according to an embodiment of the present invention.

FIG. 4 is a schematic diagram of an established virtual storage system and a solution of processing a read/write request according to an embodiment of the present invention.

Figure 5:
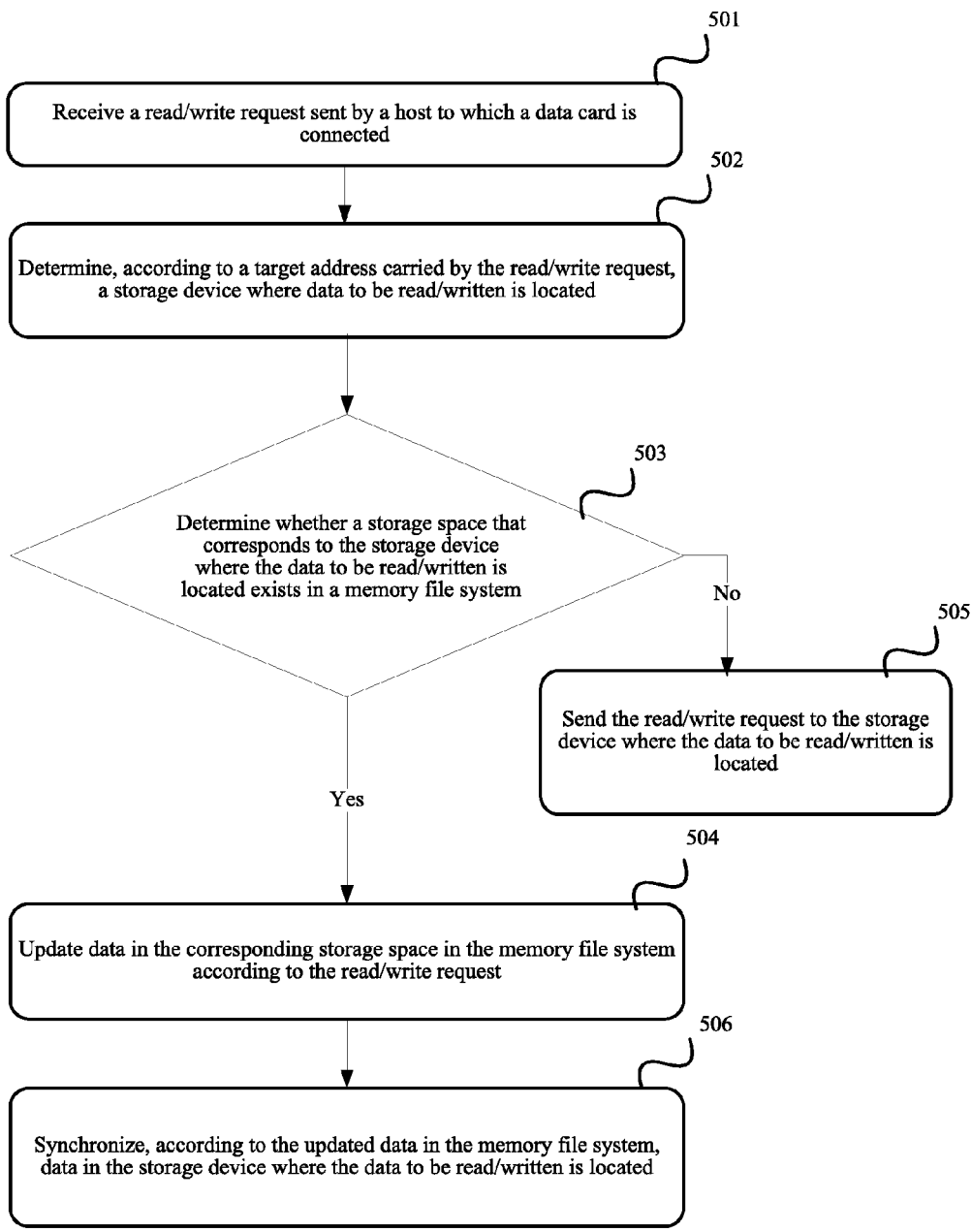
FIG. 5 is a flow chart of a method for reading and writing data in a data card with an extended storage space according to an embodiment of the present invention.

FIG. 5 is a flow chart of a method for reading and writing data in a data card with an extended storage space according to an embodiment of the present invention.

Step 501: Receive a read/write request sent by a host to which the data card is connected.

Step 502: Determine, according to a target address carried by the read/write request, a storage device where data to be read/written is located.

Step 503: According to correspondence between a storage space in the memory file system and a mounted storage device, determine whether a storage space that corresponds to the storage device where the data to be read/written is located exists in the memory file system, and if yes, proceed to step 504; otherwise, proceed to step 505.

Step 504: If a storage space that corresponds to the storage device where the data to be read/written is located exists in the memory file system, update data in the corresponding storage space in the memory file system according to the read/write request, and proceed to step 506.

Step 505: If a storage space that corresponds to the storage device where the data to be read/written is located does not exist in the memory file system, send the read/write request to the storage device where the data to be read/written is located.

Step 506: Synchronize, according to the updated data in the memory file system, data in the storage device where the data to be read/written is located.

When receiving a read/write request sent by a host, a virtual storage system first determines, according to an address in the read/write request, a storage device where data to be read/written is located. Further, according to the foregoing correspondence, the virtual storage system determines a storage space in a memory file system, where the storage space corresponds to the storage device where the data to be read/written is located. Then, the virtual storage system reads real-time data (herein, the real-time data refers to data that is copied, according to the correspondence in step 50, from the storage device to a corresponding storage space of the memory file system) from the memory file system according to a read request; or modifies real-time data in the memory file system according to a write request, and synchronizes data in a corresponding storage device according to the modified real-time data.

Optionally, to optimize input/output (I/O) performance of the virtual storage system, in step 506, the synchronizing, according to the updated data, data in the storage device where the data to be read/written is located may adopt the following manner.

First, according to a real-time quality level of the data to be read/written, and/or interface transmission performance of the storage device where the data to be read/written is located, a corresponding read/write policy is selected from a read/write policy table (as shown in Table 2). Specifically, according to a real-time quality level of the data to be read/written, a corresponding read/write policy is selected from a read/write policy table (as shown in Table 2), where the read/write policy table includes at least one read/write policy and a real-time quality level that corresponds to each read/write policy; or according to interface transmission performance of the storage device where the data to be read/written is located, a read/write policy is selected from a read/write policy table, where the read/write policy table includes at least one read/write policy and an interface transmission performance range that corresponds to each read/write policy; or according to a real-time performance level of the data to be read/written and interface transmission performance of the storage device where the data to be read/written is located, a read/write policy is selected from a read/write policy table, where the read/write policy table includes at least one read/write policy, a real-time performance level that corresponds to each read/write policy, and an interface transmission performance range that corresponds to each read/write policy.

Then, according to a selected read-write policy, the data in the corresponding storage space in the memory file system is synchronized into a corresponding storage device.

TABLE 2

| Policy identifier and content | Real-time quality level of data | Interface transmission performance of a storage device |
|---|---|---|
| R1: Write in real time, and read in real time | 1 | High [50 MB/s, ∞) |
| R2: Write with a delay, and read with a delay | 3 | Low (0, 10 KB/s] |
| R3: Read in real time, and write with a delay | 2 | Medium [10 Kbyte, 50 MB/s] |
| ... | ... | ... |
| Rn: ... | ... | ... |

In this embodiment, the real-time quality level of the data is classified into three types, where data with level-1 real-time quality includes a system file, a program file, and the like; data with level-2 real-time quality includes a file such as a document; and data with level-3 real-time quality includes an e-mail file, and the like. Likewise, the interface transmission performance of the storage device may also be classified into three interval ranges, as shown in Table 1. Definitely, a manner of classifying the real-time quality level of the data may also be flexibly set according to an actual situation. For example, if the data to be read/written in this embodiment is an e-mail file, and interface transmission performance of a network storage RM where the e-mail file is located is 3 KB/s, it is determined that the real-time quality level of the data is a level 3 and the interface transmission performance is in a range of "low"; and then, a read/write policy R2 is selected from Table 1, and synchronization between the data in the memory file system and data in the network storage RM is performed according to R2. Definitely, a read/write policy may also be selected only according to one of the real-time quality level and the interface transmission performance.

In the data reading method provided in the embodiment of the present invention, when a read/write request is received from a host, data in a storage space in a memory file system is preferentially updated, where the storage space corresponds to a storage device where data to be read/written is located; and then, data in the storage device where the data to be read/written is located is synchronized according to the updated data, thereby improving a data read/write speed.

Optionally, after mounting each storage device on the host to form the virtual storage system in step 40 in FIG. 1, the method further includes: copying hot spot data in the data card to a pre-determined storage space of the memory file system, where the hot spot data includes data of which a read/write frequency exceeds a set threshold, for example, a system file and frequently used software. In step 40, correspondence between the pre-determined storage space of the memory file system and a storage position of the hot spot data in the data card is set, so as to synchronize, through step 50, updated data in the pre-determined storage space of the memory file system into the data card when the read/write request is received. A data read speed may be improved by setting the correspondence between the pre-determined storage space of the memory file system and the storage position of the hot spot data in the data card.

Optionally, for the convenience of selecting a storage position of data by a user, after mounting each storage device on the host to form the virtual storage system in step 40, the method further includes displaying and outputting relevant information of each storage device, as shown in table 3, for example, displaying an identifier of a storage device, a type of the storage device (for example, a local storage and a network storage, where the local storage may further include USB storage and hard disk storage), interface transmission performance of the storage device, a current connection state, read/write permission, a total storage space, and a remaining storage space; and definitely, the relevant information of each storage device may also be displayed through visual forms such as an icon, a diagram, or a cartoon.

TABLE 3

| Storage device identifier | Type of the storage device | Total storage space | Remaining storage space | Interface transmission performance | Connection state |
|---|---|---|---|---|---|
| Disk E | Local storage | 100 GB | 80 GB | 100 MB/s | Connected |
| 139 space | Network storage | 5 GB | 4 GB | 60 MB/s | Connected |
| Gmail service space | Network storage | 5 GB | 3 GB | 10 MB/s | Disconnected |
| NFS service space | Network storage | 1 GB | 700 MB | 50 MB/s | Disconnected |
| FTP service space | Network storage | 100 MB | 200 MB | 80 MB/s | Connected |

After the user selects, according to displayed relevant information of each mounted storage device, a storage device where data to be read/written is to be stored, and the user sends a read/write request through the host, where an address in the read/write request is in a range of an address space of a selected storage device.

Figure 6:
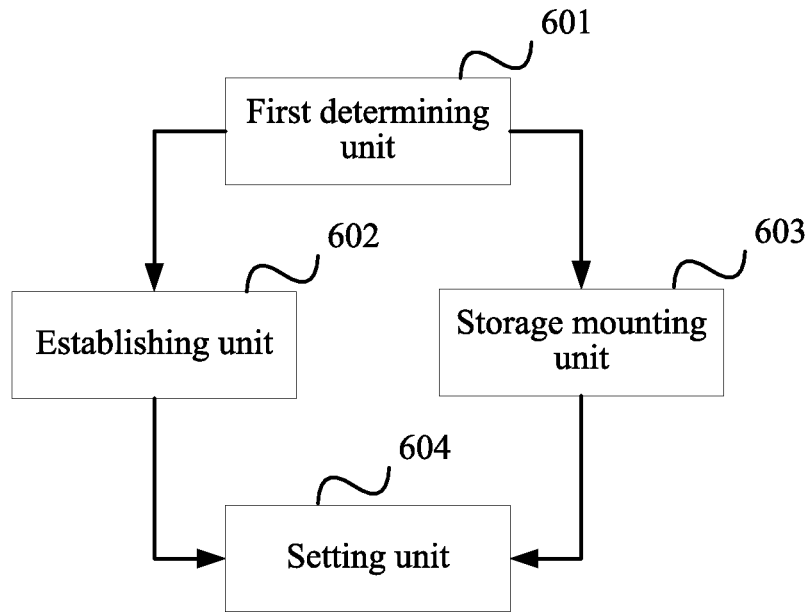
FIG. 6 is a schematic structural diagram of a data storage apparatus according to an embodiment of the present invention.

Correspondingly, an embodiment of the present invention further provides a data storage apparatus, and as shown in FIG. 6, the apparatus includes a first determining unit 601, an establishing unit 602, a storage mounting unit 603, and a setting unit 604, which are specifically described as follows:

The first determining unit 601 is configured to, after a data card is connected to a host, determine an operating system type of the host.

The establishing unit 602 is configured to read a configuration file that corresponds to the operating system type and is stored in the data card, and establish, according to first mounting information in the configuration file, a memory file system that is compatible with a file system type of the host, where the first mounting information includes a memory file system type and a mounting parameter, and the mounting parameter includes capacity of the memory file system.

The storage mounting unit 603 is configured to mount a storage device according to second mounting information in the configuration file, where the storage device includes a local storage of the host and/or a network storage that is connected to the host, and the second mounting information includes a supportable file system type, an access protocol that is correspondingly used when a storage device with a different file system type is mounted, a mounting sequence, and a mounting position.

The setting unit 604 is configured to set, according to configuration information in the configuration file, correspondence between a storage space in the memory file system and a mounted storage device, where the configuration information includes an identifier of a storage device, whether to set a corresponding storage space for a storage device that corresponds to an identifier of each storage device in the memory file system, and a size of a set storage space.

Optionally, the setting unit 604 is further configured to copy hot spot data in the data card to a pre-determined storage space of the memory file system, where the hot spot data includes data of which a read/write frequency exceeds a set threshold; and set correspondence between the pre-determined storage space of the memory file system and a storage position of the hot spot data in the data card.

Figure 7:
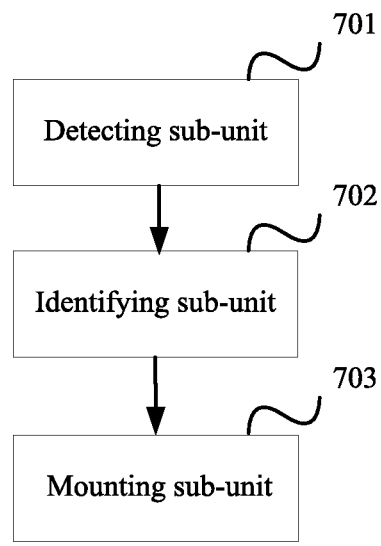
FIG. 7 is a schematic structural diagram of a storage mounting unit in a data storage apparatus according to an embodiment of the present invention.

Further, referring to FIG. 7, the storage mounting unit 603 specifically includes a detecting sub-unit 701, configured to control the host to detect, in a one by one manner, according to the mounting sequence indicated in the second mounting information, whether a storage device that corresponds to each storage device identifier is connected to the host, an identifying sub-unit 702, configured to, if the detecting sub-unit 701 detects that a storage device that corresponds to a storage device identifier is connected to the host, identify a file system type that corresponds to the storage device, and a mounting sub-unit 703, configured to load a corresponding virtual disk drive program through an access protocol that corresponds to the file system type of the storage device that is identified by the identifying sub-unit 702, and mount the storage device at a pre-determined mounting position in a file system of the host.

Figure 8:
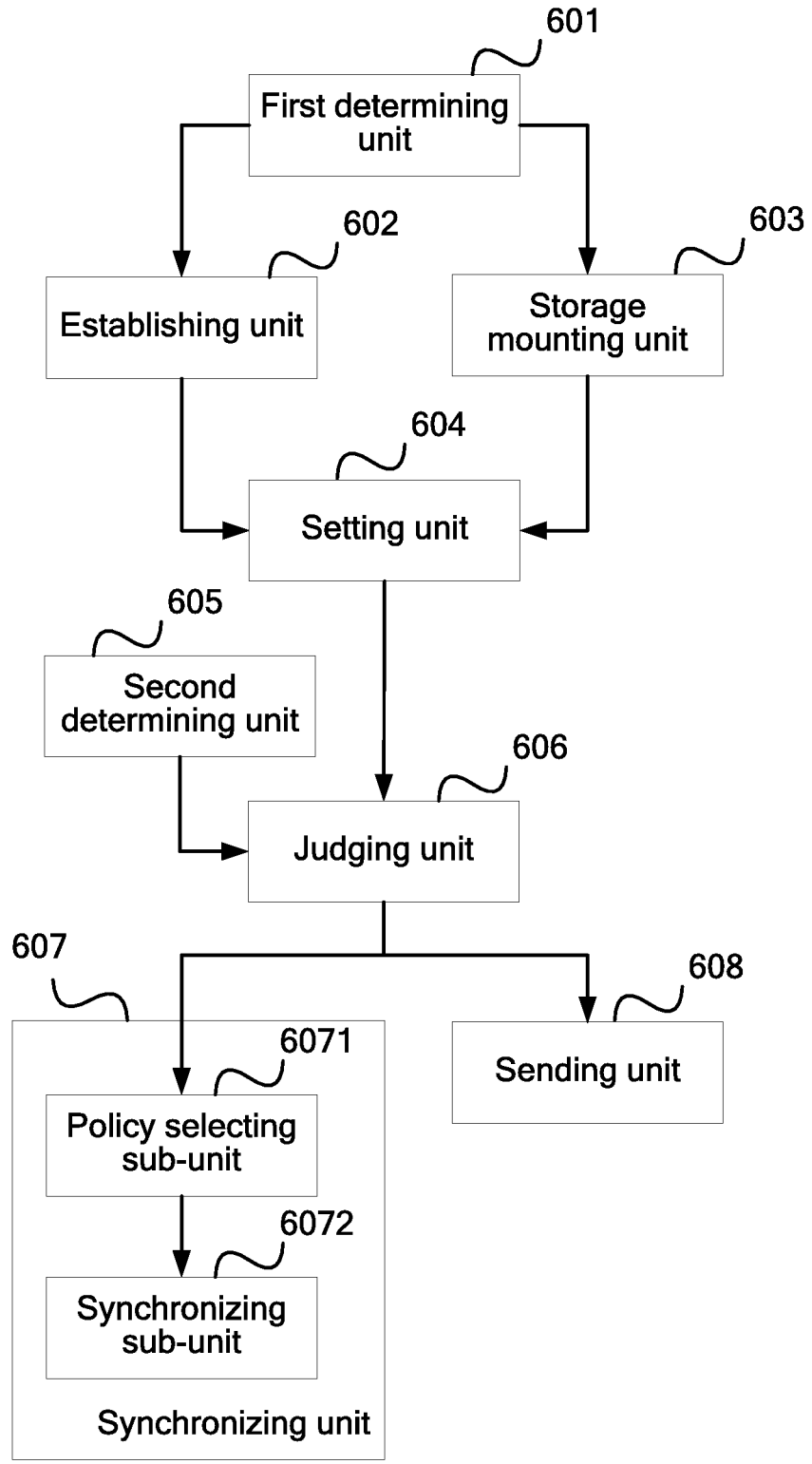
FIG. 8 is another schematic structural diagram of a data storage apparatus according to an embodiment of the present invention.

Further, referring to FIG. 8, the apparatus shown in FIG. 6 further includes a second determining unit 605, configured to, after a read/write request sent by the host is received, determine a storage device where data to be read/written is located, a judging unit 606, configured to determine, according to the correspondence set by the setting unit 604, whether a storage space that corresponds to the storage device where the data to be read/written is located exists in the memory file system, where the storage device where the data to be read/written is located is determined by the second determining unit 605, a synchronizing unit 607, configured to, if the judging unit 606 determines that a storage space that corresponds to the storage device where the data to be read/written is located exists in the memory file system, update data in the corresponding storage space in the memory file system according to the read/write request, and synchronize, according to the updated data, data in the storage device where the data to be read/written is located, and a sending unit 608, configured to, if the judging unit 606 determines that a storage space that corresponds to the storage device where the data to be read/written is located does not exist in the memory file system, send the read/write request to the storage device where the data to be read/written is located.

Optionally, the synchronizing unit 607 specifically includes a policy selecting sub-unit 6071, configured to select, according to a real-time quality level of the data to be read/written, a read/write policy from a read/write policy table, where the read/write policy table includes at least one read/write policy and a real-time quality level that corresponds to each read/write policy; or select, according to interface transmission performance of the storage device where the data to be read/written is located, a read/write policy from a read/write policy table, where the read/write policy table includes at least one read/write policy and an interface transmission performance range that corresponds to each read/write policy, and a synchronizing sub-unit 6072, configured to synchronize, according to the read/write policy selected by the policy selecting sub-unit 6071, the data in the corresponding storage space in the memory file system into a corresponding storage device.

It should be noted that, based on the apparatus shown in FIG. 6, auxiliary units added in FIG. 7 and FIG. 8 may be combined with each other, so as to obtain a data storage apparatus with a more comprehensive function.

Persons of ordinary skill in the art may understand that all or part of the steps of the methods in the foregoing embodiments may be implemented by a program instructing relevant hardware. The program may be stored in a computer readable storage medium, such as a ROM/RAM, a magnetic disk, or an optical disk.

Apparently, persons skilled in the art may make various modifications and changes to the present invention without departing from the spirit and scope of the present invention. Therefore, if these modifications and changes made to the present invention fall within the scope of the claims of the present invention and an equivalent technology of the present invention, the present invention is also intended to cover these modifications and changes.

What is claimed is:

1. A method for facilitating data storage of a server based on information stored in a data card, wherein the server includes a processor and a memory file system, the method being performed by the processor, the method comprising:
  detecting a data card connected with the server;
  obtaining a configuration file corresponding to a type of operating system of the server from a plurality of configuration files stored in the data card, wherein each configuration file corresponds to a type of operating system;
  allocating memory space from the memory file system as a cache, based upon first information included in the configuration file, wherein the first information indicates a size of the memory space;
  formatting the memory space into a partition whose type is compatible with the type of the operating system of the server;
  mounting a storage device based upon second information included in the configuration file, wherein the second information includes ID of the storage device;
  recording a first mapping relationship between an address of the partition and the storage device;
  moving hot spot data from the data card to the partition, the hot spot data being data of which an access frequency exceeds a set threshold;
  recording a second mapping relation between an address of the hot spot data in the data card and an address of the hot spot data in the partition;
  receiving a read request, which includes the address of the hot spot data in the data card; and
  obtaining the hot spot data from the address in the partition, based upon the address in the data card and the second mapping relation.

2. The method according to claim 1, wherein the storage device is used to store data that is to be stored in the data card.

3. The method according to claim 1, wherein the configuration file is stored in a first storage area of the data card; and
  wherein the first storage area is set to a CD-ROM driver data format by a CD-ROM driver virtual program or in a hardware manner.

4. The method according to claim 1, wherein mounting a storage device based upon the second information in the configuration file comprises:
  obtaining the ID of the storage device from the data card;
  determining that the storage device corresponding to the ID is connected to the server;
  identifying a file system type of the storage device based upon the determination; and
  mounting the storage device through an access protocol corresponding to the file system type of the storage device.

5. A server for facilitating data storage comprising:
  a processor and a memory file system,
  the processor being configured to:
  detect a data card connected with the server;
  obtain a configuration file corresponding to a type of operating system of the server from a plurality of configuration files stored in the data card, wherein each configuration file corresponds to a type of operating system;
  allocate memory space from the memory file system as a cache, based upon first information included in the configuration file, wherein the first information indicates a size of the memory space;
  format the memory space into a partition whose type is compatible with the type of the operating system of the server;
  mount a storage device based upon second information included in the configuration file, wherein the second information includes ID of the storage device;
  record a first mapping relationship between an address of the partition and the storage device;
  move hot spot data from the data card to the partition, the hot spot data being data of which an access frequency exceeds a set threshold;
  record a second mapping relation between an address of the hot spot data in the data card and an address of the hot spot data in the partition;
  receive a read request, which includes the address of the hot spot data in the data card; and obtain the hot spot data from the address in the partition, based upon the address in the data card and the second mapping relation.

6. The server according to claim 5, wherein the storage device is used to store data that is to be stored in the data card.

7. The server according to claim 5, wherein the configuration file is stored in a first storage area of the data card, and wherein the first storage area is set to a CD-ROM driver data format by a CD-ROM driver virtual program or in a hardware manner.

8. The server according to claim 5, wherein the processor is further configured to:
- obtain the ID of the storage device from the data card;
- determine that the storage device corresponding to the ID is connected to the server;
- based upon the determination, identify a file system type of the storage device; and
- mount the storage device through an access protocol corresponding to the file system type of the storage device.

* * * * *